(12) United States Patent
Berry et al.

(10) Patent No.: US 8,478,881 B2
(45) Date of Patent: Jul. 2, 2013

(54) SYSTEM AND METHOD FOR TRANSFERRING LARGE AMOUNT OF DATA IN WEB SERVICE TRANSACTION

(75) Inventors: Charles Franklin Berry, Apalachin, NY (US); Glenn C. Godoy, Endwell, NY (US); Nitin Jhingan, Vestal, NY (US); Amy Jeanne Snavely, Binghamton, NY (US)

(73) Assignee: International Business Machines Corporation, Armonk, NY (US)

(*) Notice: Subject to any disclaimer, the term of this patent is extended or adjusted under 35 U.S.C. 154(b) by 717 days.

(21) Appl. No.: 12/277,771

(22) Filed: Nov. 25, 2008

(65) Prior Publication Data

US 2010/0131655 A1    May 27, 2010

(51) Int. Cl.
*G06F 15/16* (2006.01)
(52) U.S. Cl.
USPC ........... 709/227; 709/217; 709/218; 709/219; 709/225
(58) Field of Classification Search
USPC .......................... 709/227, 217, 218, 219, 225
See application file for complete search history.

(56) References Cited

U.S. PATENT DOCUMENTS

| | | | |
|---|---|---|---|
| 6,108,703 A | 8/2000 | Leighton et al. | |
| 6,553,413 B1 | 4/2003 | Leighton et al. | |
| 6,957,390 B2 * | 10/2005 | Tamir et al. | 715/744 |
| 7,069,267 B2 | 6/2006 | Spencer, Jr. | |
| 7,103,645 B2 | 9/2006 | Leighton et al. | |
| 7,272,625 B1 | 9/2007 | Hannel et al. | |
| 7,516,195 B2 * | 4/2009 | Collet et al. | 709/218 |
| 2006/0265720 A1 * | 11/2006 | Cai et al. | 719/330 |
| 2008/0270709 A1 * | 10/2008 | Smits et al. | 711/147 |

OTHER PUBLICATIONS

Berners-Lee et al. Uniform Resource Locators (URL). The Internet Engineering Task Force, Network Working Group. Request for Comments: 1738, Category: Standards Track. Dec. 1994. [online]. 24 pages. [retrieved on Nov. 14, 2008]. Retrieved from the Internet:<URL: http://www.ietf.org/rfc/rfc1738.txt?number=1738>.

* cited by examiner

*Primary Examiner* — Andrew Georgandellis
(74) *Attorney, Agent, or Firm* — Schmeiser, Olsen & Watts; John R. Pivnichny

(57) ABSTRACT

A system and associated method for web service data for a web service transaction are disclosed. A client program that employs the web service transaction invokes a pair of web service calls to transfer the web service data to and from a web service program that executes the web service transaction. The web service program establishes a user session between the web service program and a web interface program. During the user session, the web service transaction is performed as a user of the client program directly interacts with the web service program through the web interface program. When the user session is completed, the client program retrieves the web service data resulting from the web service transaction from the web service program.

20 Claims, 7 Drawing Sheets

METHOD TRANSFERRING WEB SERVICE DATA

EXAMPLE OF CAM USER SESSION DATA:
TCAM_USER_SESSION

| E01 CAMUS Id |
| --- |
| E11 CAMUS_Web_Id |
| E12 CAMUS_Locale_Cd |
| E13 CAMUS_Lang_Cd |
| E14 AcctPurp_Cd |
| E15 InstAppl_Id |
| E16 Doc_Key |
| E17 CAMUS_Status_Cd |
| E18 CAMUS_CompAct_Cd |

FIG. 3

SYSTEM AND METHOD FOR TRANSFERRING LARGE AMOUNT OF DATA IN WEB SERVICE TRANSACTION

FIELD OF THE INVENTION

The present invention discloses a system and associated method for effectively transferring large amount of data between a user program and a web application servicing complex transactions for the user program.

BACKGROUND OF THE INVENTION

Conventional client program of a web application transfers data gathered by user inputs within a Uniform Resource Locator (URL). Data within the URL, however, are limited in the amount of data to be transferred, thus the data transferring method of conventional client program cannot support a web application demanding bidirectional transfers of large amount of data such as a sizable document and/or extensive information.

Thus, there is a need for a system and associated method that overcomes at least one of the preceding disadvantages of current methods and systems for transferring data between web applications.

SUMMARY OF THE INVENTION

The present invention provides a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a computer program product, comprising a computer usable medium having a computer readable program code embodied therein, said computer readable program code containing instructions that when executed by a processor of a computer system implement a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a computer system comprising a processor and a computer readable memory unit coupled to the processor, said memory unit containing instructions that when executed by the processor implement a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a method and system that overcomes at least one of the current disadvantages of conventional method and system for transferring large amount of data between web applications.

BRIEF DESCRIPTION OF THE DRAWINGS

FIG. 3 is an example of the CAM user session data structure TCAM_User_Session, in accordance with the embodiments of the present invention.

DETAILED DESCRIPTION OF THE INVENTION

Figure 1:
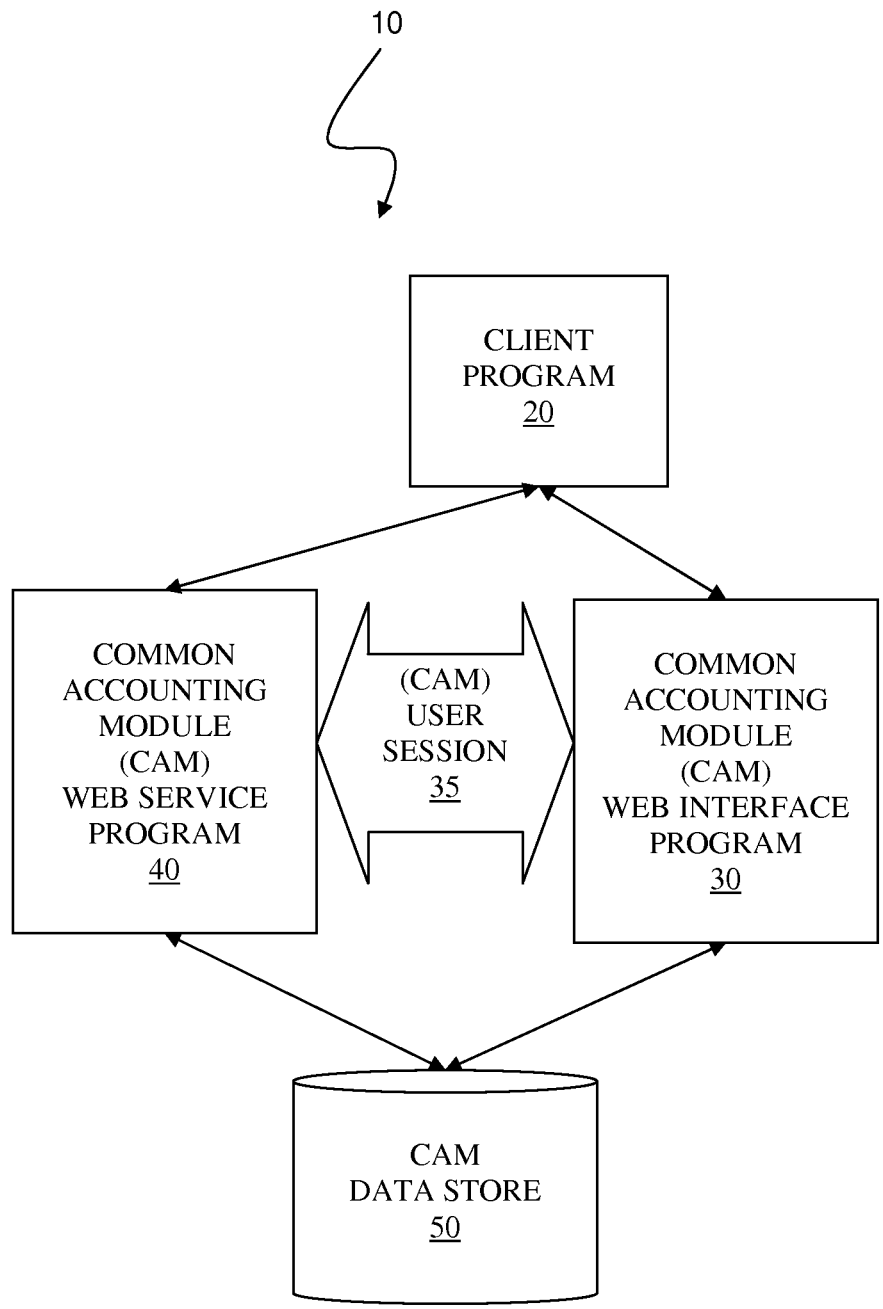
FIG. 1 illustrates a system for transferring large amount of data in a web service transaction, in accordance with embodiments of the present invention.

FIG. 1 illustrates a system 10 for transferring large amount of data in a web service transaction, in accordance with embodiments of the present invention.

The system comprises a client program 20, a CAM web interface program 30, a CAM web service program 40, and a CAM data store 50.

The client program 20 is a web application program that employs services provided by the CAM web service program 40. The client program 20 executes a RequestSession web service call that requests the CAM web service program to establish a CAM user session 35 and that transmits information necessary for the CAM user session 35 to the CAM web service program 40. During the CAM user session 35, a user of the client program 20 interactively creates and stores data in the CAM data store 50. Upon concluding the CAM user session 35, the client program 20 acquires accounting data from the CAM web service program 40 in response to executing a GetSessionResult web service call. See description of FIG. 2, infra, for details of the web service calls.

The CAM web interface program 30 guides the user interactively through creation of a set of complete, valid accounting data. The CAM web interface program 30 operates independently from the CAM web service program 40 in storing accounting data in the CAM data store 50.

The CAM web service program 40 establishes the CAM user session 35 in response to the RequestSession web service call. The CAM web service program 40 also compiles results of the CAM user session 35 and returns to the caller application 20 in response to the GetSessionResults web service call.

The CAM data store 50 comprises accounting data necessary to perform services of the CAM web service program 40 and the CAM web interface program 30. In one embodiment of the system 10, the CAM data store 50 comprises a purchase document received from the client program 20 and accounting data that are modified by the CAM web interface program 30 pursuant to requests from the user of the client program 20 during the CAM user session 35.

Figure 2:
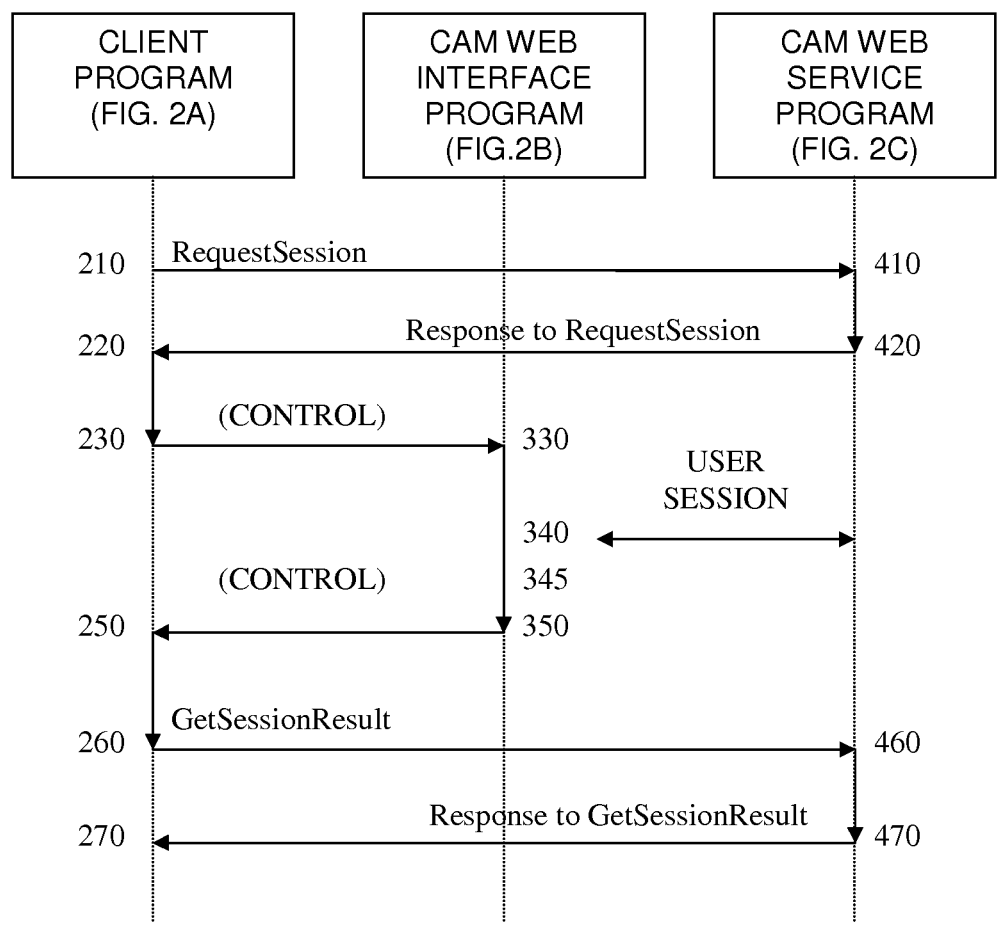
FIG. 2 is a control flow chart describing how the client program, the Common Accounting Module (CAM) web interface program, and the CAM web service program interoperate with one another to transfer large amount of data in web service transactions, in accordance with the embodiments of the present invention.

FIG. 2 is a control flow chart describing how the client program, the CAM web interface program, and the CAM web service program interoperate with one another to transfer large amount of data in web service transactions, in accordance with the embodiments of the present invention.

The web service calls of the present invention comprise a RequestSession web service call and a GetSessionResult web service call. The client program executes the RequestSession web service call to establish a CAM user session on the CAM web interface program for the client program. After the CAM user session is established, the CAM web interface program takes control over from the client program. The CAM user session is terminated upon a request by a user interacting with the CAM web interface program. The client program takes control back from the CAM web interface program and executes the GetSessionResult web service call to obtain accounting data modified during the CAM user session from the CAM data store. See FIG. 2A, infra, for details of steps 210, 220, 230, 250, 260, and 270, performed by the client program. See FIG. 2B, infra, for details of steps 330, 340, 345, and 350, performed by the CAM web interface program. See FIG. 2C, infra, for details of steps 410, 420, 460, and 470, performed by the CAM web service.

Figure 2A:
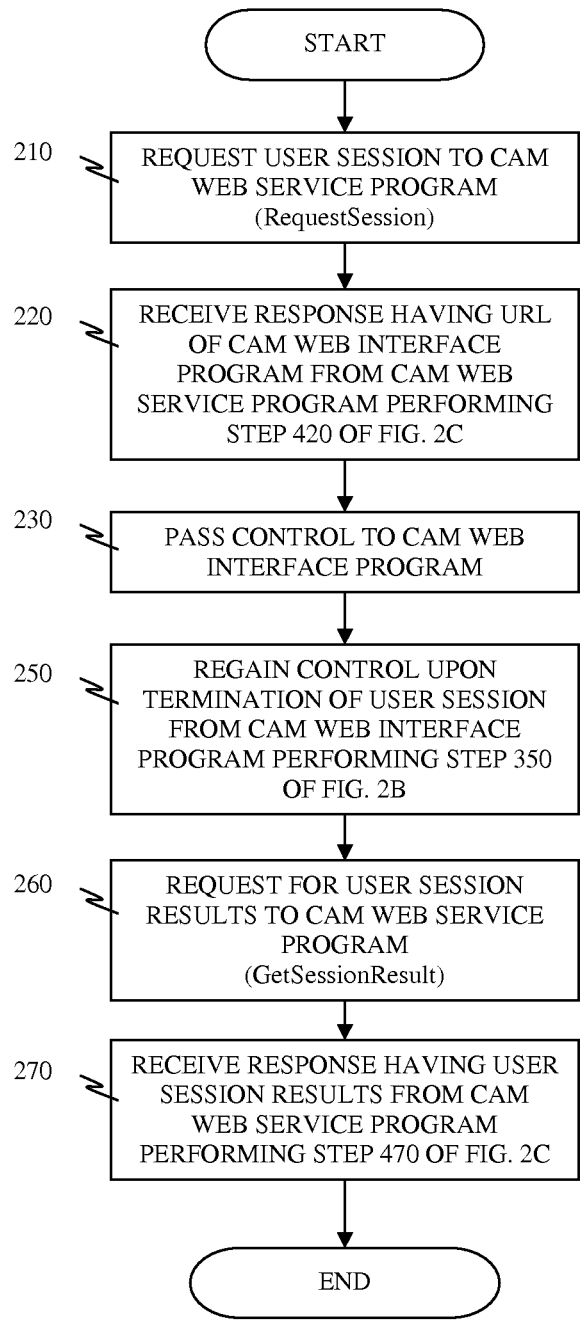
FIG. 2A is a flowchart depicting a method for transferring large amount of data in web service transactions performed by the client program, in accordance with the embodiments of the present invention.
Figure 2B:
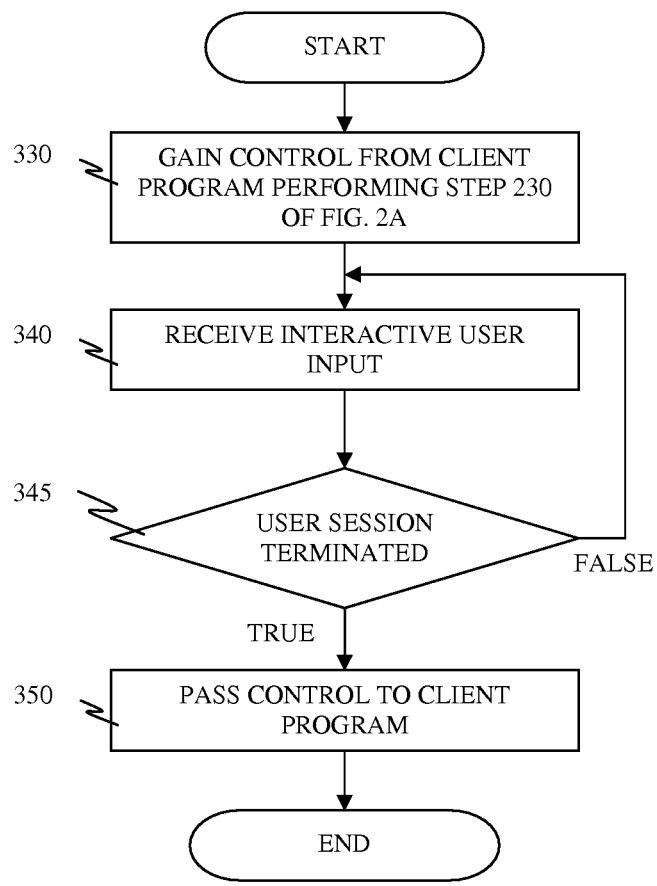
FIG. 2B is a flowchart depicting a method for transferring large amount of data in web service transactions performed by the CAM web interface program, in accordance with the embodiments of the present invention.
Figure 2C:
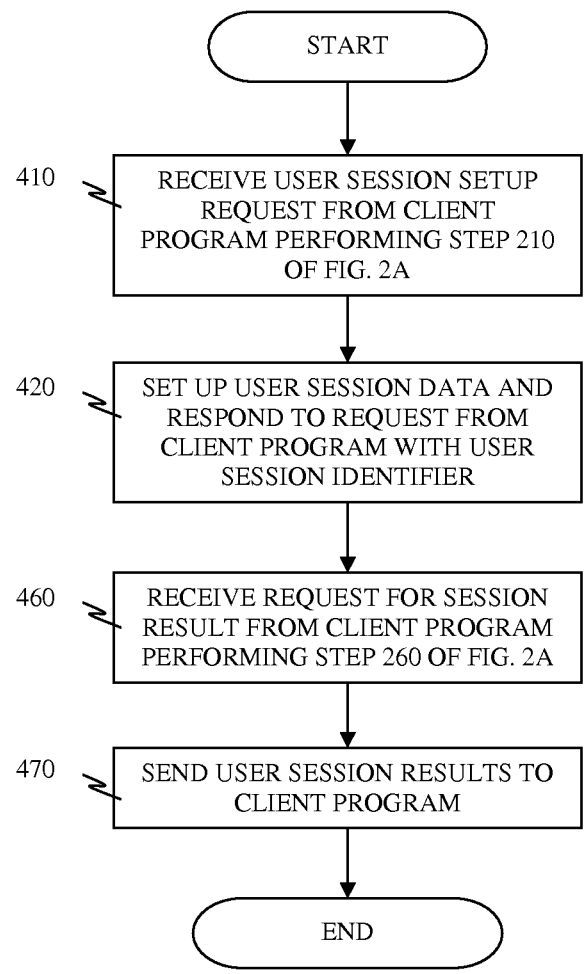
FIG. 2C is a flowchart depicting a method for transferring large amount of data in web service transactions performed by the CAM web service, in accordance with the embodiments of the present invention.

The CAM web service program of FIG. 2C, infra, and the CAM web interface program of FIG. 2B, infra, are independent of one another in terms of respective functionalities. The CAM web application handles only user interface, while the CAM web service program initializes the CAM user session, and the purchasing document through operations upon the CAM data store.

FIG. 2A is a flowchart depicting a method for transferring large amount of data in web service transactions performed by the client program, in accordance with the embodiments of the present invention.

The client program is a web application that a user interacts with to use the services provided by the CAM web service. The client program uses a pair of web service calls to establish a CAM user session and to retrieve a result of the CAM user session.

In step 210, the client program sends a request for a CAM user session to the CAM web service program by executing a RequestSession web service call. In this specification, the term CAM user session and the term a CAM session are used interchangeably. The RequestSession web service call passes, from the client program to the CAM web service, a purchasing document comprising data items to be serviced by the CAM web service, and a ReturnToURL representing a Uniform Resource Locator (URL) of the client program that a thread of execution must return after the CAM user session is terminated. In this specification, a thread of execution and a control are used interchangeably.

In step 220, the client program receives a response of the RequestSession web service call from the CAM web service program that performs step 420 of FIG. 2C, infra. The response to the RequestSession web service call comprises a URL of the CAM web interface program that has a parameter with a value of a session identifier sent by the CAM web service program performing step 420 of FIG. 2C, infra.

In step 230, the client program passes the control to the CAM web interface program as located by the URL of the CAM web interface program of step 220.

In step 250, the client program regains control from the CAM web interface program after the user of the client program terminates the CAM user session.

In step 260, the client program sends a request for results of services performed during the CAM user session by executing a GetSessionResult web service call. The GetSessionResult web service call requests information on which action the user have taken to terminate the CAM user session and the purchasing document with accounting data provided during the CAM user session if the user session was terminated with a "save" action to keep the data provided during the user session.

In step 270, the client program receives a response to the request of step 260 from the CAM web service program that performs step 450 of FIG. 2C, infra. The response comprises accounting information that is modified during the CAM user session.

FIG. 2B is a flowchart depicting a method for transferring large amount of data in web service transactions performed by the CAM web interface program, in accordance with the embodiments of the present invention.

In step 330, the CAM web interface program acquires control from the client program that performs step 230 of FIG. 2A, supra. The CAM web interface program operates for the CAM user session established through steps 210, 410, 420, and 220 as shown in FIG. 2, supra.

During the CAM session, the CAM web interface program presents, to the user of the caller application, a series of user interface screens for CAM accounting operations and receives inputs from the user. The user provides information applicable to the purchasing document that has been stored in the CAM data store by the CAM web service program performing step 410 of FIG. 2C, infra.

In steps 340 and 345, the CAM web interface program receives an input from a user of the client program until the CAM web interface program is terminated by the user.

In step 350, the CAM web interface program passes the control back to the client program pursuant to a value of the ReturnToURL as stored in InstAppl_Id attribute of the TCAM_User_Session row. See FIG. 3, infra, for details of the TCAM_User_Session row.

FIG. 2C is a flowchart depicting a method for transferring large amount of data in web service transactions performed by the CAM web service, in accordance with the embodiments of the present invention.

In step 410, the CAM web service program receives a request to set up a CAM user session from the client program performing step 210 of FIG. 2A, supra. The request comprises a ReturnToURL data that is a URL of the client program. The ReturnToURL is used for the CAM web service program to redirect a control to the client program after the CAM user session is completed. The CAM web service program also receives a purchasing document from the client program performing step 210. The CAM web service program stores the ReturnToURL and the purchasing document in the CAM data store to service the CAM user session.

In step 420, the CAM web service program generates and sends a response to the RequestSession web service call.

Upon receiving the request, the CAM web service program generates a session identifier of a new CAM user session and inserts a record of the CAM user session in a session data table with the session identifier. The response to the client program comprises the generated session identifier and a URL of the CAM web interface program. The client program subsequently redirects the user's browser to the URL of the CAM web interface program, passing the session identifier as a parameter.

In one embodiment of the present invention, the CAM user session of the user of the client program is represented as the TCAM_User_Session row.

In step 460, the CAM web service program receives a request to provide a result of the CAM user session from the client program that performs step 260 of FIG. 2A, supra.

In step 470, the CAM web service program sends the result of the CAM user session to the client program in response to the request received in step 460. The CAM web service program cleans up the CAM data store by removing the CAM user session data and the purchasing document.

FIG. 3 is an example of the CAM user session data structure TCAM_User_Session, in accordance with the embodiments of the present invention.

TCAM_User_Session is a table comprising a respective row for each active session. There can be multiple concurrent sessions at any point in time. Each active session comprises attributes shown in lines E01, E11 to E18 of FIG. 3.

In line E01, CAMUS Id represents an identifier generated at the point the client program, such as IBM® Buy On Demand program, calls the Common Accounting Module (CAM) at this time a user session (CAMUS) is established. (IBM is a registered trademark of International Business Machines Corporation in the United States and other countries.) The CAMUS Id identifier provides a linkage between an end-user, the client program and the document (or business transaction) for which accounting data elements are being collected.

In line E11, CAMUS_Web_Id represents an identifier used to log onto the web to ensure that a user is authentic. The CAMUS_Web_Id uniquely identifies a user of the system.

In line E12, CAMUS_Locale_Cd represents a geopolitical area contained within and defined by one and only one Country and describes cultural convention. A Country may define many Locales. Cultural conventions may include, inter alia, date and time formats, monetary and non-monetary numeric formatting, collating preferences, and official or tolerated language. The locale is defined in the client program and utilized in the CAM user session. The CAM is configured such that the CAM can support the aggregated list of locales defined in all client programs that call the CAM and present information in the language and format desired by a user.

In line E13, CAMUS_Lang_Cd represents an expected language translation that a user is presented. The CAMUS_Lang_Cd is defined by the client program. The CAM is configured such that the CAM can support the aggregated list of translations defined in all client programs that call CAM.

In line E14, AcctPurp_Cd represents a business scenario or condition that affects how a user may interact with the Common Accounting Module (CAM). Various purposes for the CAM is invoked for may be, inter alia, "Create" in which an initiator wishes to provide accounting information for items that has been created, "Create" in which an initiator wishes to edit accounting he previously entered, "Alter" in which an initiator wishes to edit accounting for an item he is altering and resubmitting, and "PFA/FIN Approval" in which a Financial approver wishes to view and potentially edit/correct accounting that was submitted, etc.

In line E15, InstAppl_Id represents the application, i.e., the client program, which called the Common Accounting Module (CAM). In order to appear in this session data, the application must be configured for CAM usage.

In line E16, Doc_Key represents an aggregate attribute composed of one or more pieces of data that uniquely identify the document or transaction within a specific instance of an application system. This information ensures that the provided Doc_Key document key is unique across multiple systems which submit documents to CAM for accounting.

In line E17, CAMUS_Status_Cd represents a system level perspective on the User Session. For example, the CAM system may recognize a status of the User Session as "Active," "Complete," or "Aborted." "Complete" represents a status resulting from an action of a user, and "Aborted" is a status when a time-out event has occurred.

In line E18, CAMUS_CompAct_Cd represents a "completion action" that a user took to complete the accounting session. The completion actions may be, inter alia, "Cancel" that the user terminated the session without saving the session, "Save/Incomplete" that the user saves an incomplete accounting session followed by returning control and accounting information to the client program, "Save/Complete" that the user has finished providing all needed accounting information which has been validated and is complete, followed by returning control and accounting information to the client program.

Figure 4:
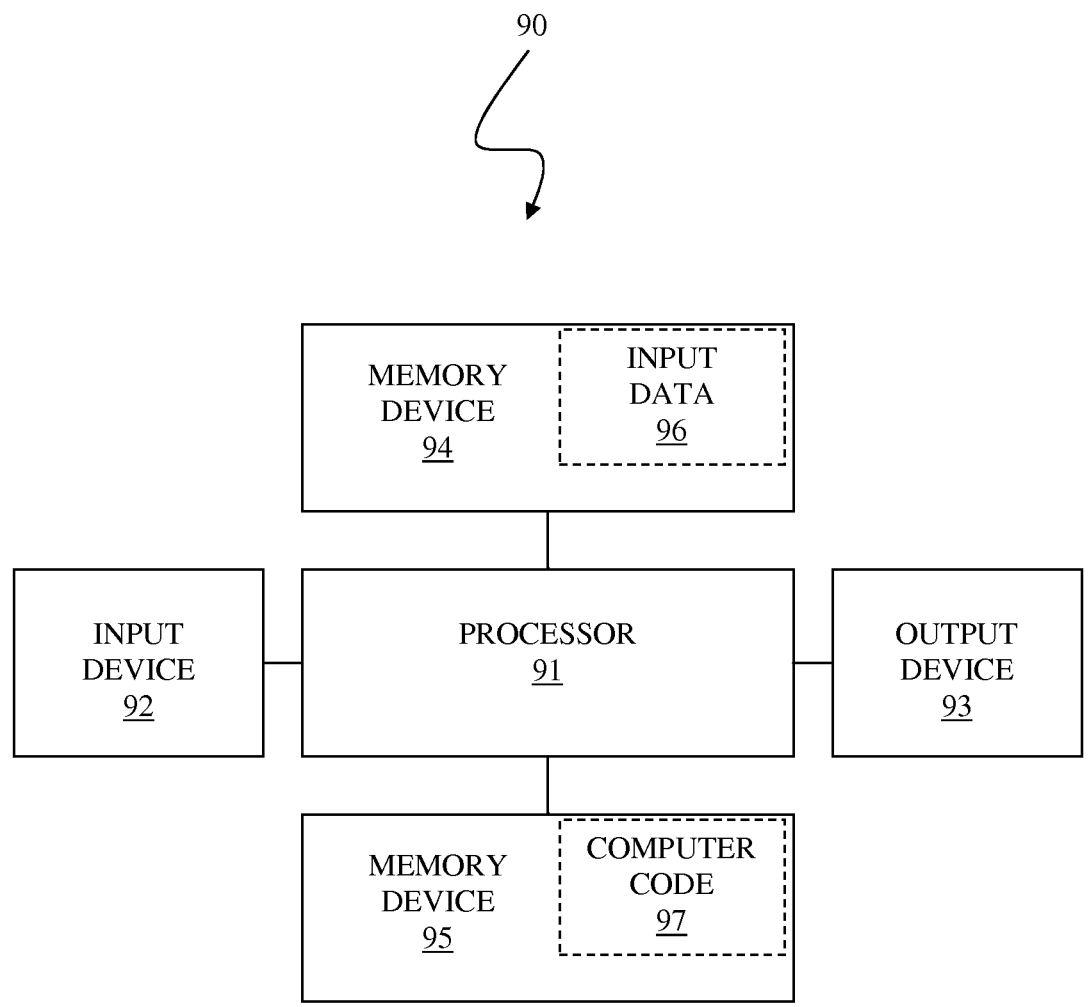
FIG. 4 illustrates a computer system used for transferring large amount of data in web service transactions, in accordance with embodiments of the present invention.

FIG. 4 illustrates a computer system 90 used for transferring large amount of data in web service transactions, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for transferring large amount of data in web service transactions according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for transferring large amount of data in web service transactions of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for transferring large amount of data in web service transactions.

In another embodiment, the invention provides a business method that performs the process steps of the invention on a subscription, advertising and/or fee basis. That is, a service provider, such as a Solution Integrator, can offer to create, maintain, support, etc. a process for transferring large amount of data in web service transactions of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for transferring unlimited amount of data for a web service transaction, the method performed by a Common Accounting Module (CAM) system comprising a client program, a web service program, a web interface program, and a data store, wherein the web service program services the web service transaction originating from the client program, the method comprising:

sending, to the web service program, a first web service call RequestSession to establish a user session between the web interface program and the web service program for a user of the client program such that the user directly interacts with the web interface program during the user session in performing the web service transaction and such that the user transfers the unlimited amount of data between the web service program and the web interface program during the user session, wherein the first web service call RequestSession comprises a return address that is a Uniform Resource Locator (URL) of the client program to which a thread of execution returns from the web interface program once the user session ends, wherein the web service program provides services to the user in performing the web service transaction, wherein the web interface program corresponds to the web service program, wherein the data store is coupled to the web service program and the web interface program corresponding to the web service program, and wherein the web service program enables the client program to access the data store;

receiving, from the web service program, a first response in response to the first web service call Request Session, the first response comprising a session identifier and an interface address, wherein the session identifier corresponds to the user session that is established by the web service program, wherein the interface address represents a Uniform Resource Locator (URL) of the web interface program by which the user accesses the web service program during the user session;

passing the thread of execution to the web interface program by use of the interface address such that the user directly interacts with the web interface program without using the client program during the user session identified by the received session identifier, wherein the web interface program directly receives interactive inputs from the user such that the user interactively creates and stores session data items in the data store in accessing the web service program during the user session;

subsequent to said passing, regaining the thread of execution from the web interface program by use of the return address upon determining that the user session is terminated;

subsequent to said regaining the thread of execution, sending, to the web service program, a second web service call GetSessionResult to retrieve session result data comprising the session data items that had been created and stored in the data store during the user session; and in response to the second web service call GetSessionResult, acquiring the session result data stored in the data store from the web service program, wherein said sending the first web service call RequestSession, said receiving, said passing, said regaining, said sending the second web service call GetSessionResult, and said acquiring are performed by the client program of the CAM system.

2. The method of claim 1, the method further comprising:
responsive to said sending the first web service call RequestSession, receiving the first web service call RequestSession from the client program, wherein the first web service call RequestSession further comprises a purchase document having multiple data items to be processed by the web service program to produce the session result data, wherein said unlimited amount of data transferred via the user session comprises the purchase document, and wherein the web service program provides accounting services;

establishing the user session pursuant to the received first web service call RequestSession by creating the session identifier and a session data associated with the session identifier, wherein the session result data comprises the session data and the purchase document, wherein the session data is a record stored in the data store that is uniquely identifiable by use of the session identifier, the session data comprising attributes of a web identifier for authenticating the user, a geographical area code for the web service transaction, a language code indicating a language to be used in the web service transaction, an accounting purpose code configuring the web service transaction, an application identifier corresponding to the client program, a document key representing a unique collection of data involved in the web service transaction, the unique collection of data including the purchase document, and a status code indicating an activity level of the user session;

associating the return address in the first web service call RequestSession with the session data in the data store; and sending the first response comprising the session identifier and the interface address to the client program such that the user utilizes the established user session for the web service transaction, wherein said receiving, said establishing, said associating, and said sending the first response are performed by the web service program.

3. The method of claim 1, said method further comprising:
receiving an input from the user, wherein the input requests a web service provided by the web service program, wherein the web service transaction comprises the web service;

requesting the web service program to perform the web service requested by the received input; and determining that the user session is terminated by the user,
wherein said receiving the input, said requesting, and said determining are performed by the web interface program during the user session, wherein the user session occurs subsequent to said passing and prior to said regaining by the client program.

4. The method of claim 3, said method further comprising:
performing the web service requested by the user via the web interface program, responsive to said requesting; and storing a result from said performing into the data store as the session result data, wherein said performing and said storing are performed by the web service program during the user session.

5. The method of claim 1, the method further comprising:
responsive to said sending the second web service call GetSessionResult by the client program, receiving the second web service call GetSessionResult to retrieve the session result data from the data store;

retrieving the session result data from the data store pursuant to the second web service call GetSessionResult, wherein the session result data comprises the session identifier and the session data items;

transmitting the retrieved session result data to the client program; and removing the session result data from the data store,
wherein said receiving the second request, said retrieving, said transmitting, and said removing are performed by the web service program.

6. A computer program product, comprising a computer usable storage device having a computer readable program code embodied therein, said computer readable program code containing instructions that when executed by a processor of a computer system implement a method for transferring unlimited amount of data for a web service transaction, the method performed by a Common Accounting Module (CAM) system comprising a client program, a web service program, a web interface program, and a data store, wherein the web service program services the web service transaction originating from the client program, the method comprising:

sending, to the web service program, a first web service call RequestSession to establish a user session between the web interface program and the web service program for a user of the client program such that the user directly interacts with the web interface program during the user session in performing the web service transaction and such that the user transfers the unlimited amount of data between the web service program and the web interface program during the user session, wherein the first web service call RequestSession comprises a return address that is a Uniform Resource Locator (URL) of the client program to which a thread of execution returns from the web interface program once the user session ends, wherein the web service program provides services to the user in performing the web service transaction, wherein the web interface program corresponds to the web service program, wherein the data store is coupled to the web service program and the web interface program corresponding to the web service program, and wherein the web service program enables the client program to access the data store;

receiving, from the web service program, a first response in response to the first web service call RequestSession, the first response comprising a session identifier and an interface address, wherein the session identifier corresponds to the user session that is established by the web service program, wherein the interface address represents a Uniform Resource Locator (URL) of the web interface program by which the user accesses the web service program during the user session;

passing the thread of execution to the web interface program by use of the interface address such that the user directly interacts with the web interface program without using the client program during the user session identified by the received session identifier, wherein the web interface program directly receives interactive inputs from the user such that the user interactively creates and stores session data items in the data store in accessing the web service program during the user session;

subsequent to said passing, regaining the thread of execution from the web interface program by use of the return address upon determining that the user session is terminated;

subsequent to said regaining the thread of execution, sending, to the web service program, a second web service call GetSessionResult to retrieve session result data comprising the session data items that had been created and stored in the data store during the user session; and in response to the second web service call GetSessionResult, acquiring the session result data stored in the data store from the web service program, wherein said sending the first web service call RequestSession, said receiving, said passing, said regaining, said sending the second web service call GetSessionResult, and said acquiring are performed by the client program of the CAM system.

7. The computer program product of claim 6, the method further comprising:

responsive to said sending the first web service call RequestSession, receiving the first web service call RequestSession from the client program, wherein the first web service call RequestSession further comprises a purchase document having multiple data items to be processed by the web service program to produce the session result data, wherein said unlimited amount of data transferred via the user session comprises the purchase document, and wherein the web service program provides accounting services;

establishing the user session pursuant to the received first web service call RequestSession by creating the session identifier and a session data associated with the session identifier, wherein the session result data comprises the session data and the purchase document, wherein the session data is a record stored in the data store that is uniquely identifiable by use of the session identifier, the session data comprising attributes of a web identifier for authenticating the user, a geographical area code for the web service transaction, a language code indicating a language to be used in the web service transaction, an accounting purpose code configuring the web service transaction, an application identifier corresponding to the client program, a document key representing a unique collection of data involved in the web service transaction, the unique collection of data including the purchase document, and a status code indicating an activity level of the user session;

associating the return address in the first web service call RequestSession with the session data in the data store; and sending the first response comprising the session identifier and the interface address to the client program such that the user utilizes the established user session for the web service transaction, wherein said receiving, said establishing, said associating, and said sending the first response are performed by the web service program.

8. The computer program product of claim 6, said method further comprising:

receiving an input from the user, wherein the input requests a web service provided by the web service program, wherein the web service transaction comprises the web service;

requesting the web service program to perform the web service requested by the received input; and determining that the user session is terminated by the user, wherein said receiving the input, said requesting, and said determining are performed by the web interface program during the user session, wherein the user session occurs subsequent to said passing and prior to said regaining by the client program.

9. The computer program product of claim 8, said method further comprising:

performing the web service requested by the user via the web interface program, responsive to said requesting; and storing a result from said performing into the data store as the session result data, wherein said performing and said storing are performed by the web service program during the user session.

10. The computer program product of claim 6, the method further comprising:

responsive to said sending the second web service call GetSessionResult by the client program, receiving the second web service call GetSessionResult to retrieve the session result data from the data store;

retrieving the session result data from the data store pursuant to the second web service call GetSessionResult, wherein the session result data comprises the session identifier and the session data items;

transmitting the retrieved session result data to the client program; and removing the session result data from the data store, wherein said receiving the second request, said retrieving, said transmitting, and said removing are performed by the web service program.

11. A computer system comprising a processor and a computer readable memory unit coupled to the processor, said memory unit containing instructions that when executed by the processor implement a method for transferring unlimited amount of data for a web service transaction, the method performed by a Common Accounting Module (CAM) system comprising a client program, a web service program, a web interface program, and a data store, wherein the web service program services the web service transaction originating from the client program, the method comprising:

sending, to the web service program, a first web service call RequestSession to establish a user session between the web interface program and the web service program for a user of the client program such that the user directly interacts with the web interface program during the user session in performing the web service transaction and such that the user transfers the unlimited amount of data between the web service program and the web interface program during the user session, wherein the first web service call RequestSession comprises a return address that is a Uniform Resource Locator (URL) of the client program to which a thread of execution returns from the web interface program once the user session ends, wherein the web service program provides services to the user in performing the web service transaction, wherein the web interface program corresponds to the web service program, wherein the data store is coupled to the web service program and the web interface program corresponding to the web service program, and wherein the web service program enables the client program to access the data store;

receiving, from the web service program, a first response in response to the first web service call RequestSession, the first response comprising a session identifier and an interface address, wherein the session identifier corresponds to the user session that is established by the web service program, wherein the interface address represents a Uniform Resource Locator (URL) of the web interface program by which the user accesses the web service program during the user session;

passing the thread of execution to the web interface program by use of the interface address such that the user directly interacts with the web interface program without using the client program during the user session identified by the received session identifier, wherein the web interface program directly receives interactive inputs from the user such that the user interactively creates and stores session data items in the data store in accessing the web service program during the user session;

subsequent to said passing, regaining the thread of execution from the web interface program by use of the return address upon determining that the user session is terminated;

subsequent to said regaining the thread of execution, sending, to the web service program, a second web service call GetSessionResult to retrieve session result data comprising the session data items that had been created and stored in the data store during the user session; and in response to the second web service call GetSessionResult, acquiring the session result data stored in the data store from the web service program, wherein said sending the first web service call Request session, said receiving, said passing, said regaining, said sending the second web service call GetSessionResult, and said acquiring are performed by the client program of the CAM system.

12. The computer system of claim 11, the method further comprising:

responsive to said sending the first web service call RequestSession, receiving the first web service call RequestSession from the client program, wherein the first web service call RequestSession further comprises a purchase document having multiple data items to be processed by the web service program to produce the session result data, wherein said unlimited amount of data transferred via the user session comprises the purchase document, and wherein the web service program provides accounting services;

establishing the user session pursuant to the received first web service call RequestSession by creating the session identifier and a session data associated with the session identifier, wherein the session result data comprises the session data and the purchase document, wherein the session data is a record stored in the data store that is uniquely identifiable by use of the session identifier, the session data comprising attributes of a web identifier for authenticating the user, a geographical area code for the web service transaction, a language code indicating a language to be used in the web service transaction, an accounting purpose code configuring the web service transaction, an application identifier corresponding to the client program, a document key representing a unique collection of data involved in the web service transaction, the unique collection of data including the purchase document, and a status code indicating an activity level of the user session;

associating the return address in the first web service call RequestSession with the session data in the data store; and sending the first response comprising the session identifier and the interface address to the client program such that the user utilizes the established user session for the web service transaction, wherein said receiving, said establishing, said associating, and said sending the first response are performed by the web service program.

13. The computer system of claim 11, said method further comprising:

receiving an input from the user, wherein the input requests a web service provided by the web service program, wherein the web service transaction comprises the web service;

requesting the web service program to perform the web service requested by the received input; and determining that the user session is terminated by the user, wherein said receiving the input, said requesting, and said determining are performed by the web interface program during the user session, wherein the user session occurs subsequent to said passing and prior to said regaining by the client program.

14. The computer system of claim 13, said method further comprising:

performing the web service requested by the web interface program, responsive to said requesting; and storing a result from said performing into the data store as the session result data, wherein said performing and said storing are performed by the web service program during the user session.

15. The computer system of claim 11, the method further comprising:

responsive to said sending the second web service call GetSessionResult by the client program, receiving the second web service call GetSessionResult to retrieve the session result data from the data store;

retrieving the session result data from the data store pursuant to the second web service call GetSessionResult, wherein the session result data comprises the session identifier and the session data items;

transmitting the retrieved session result data to the client program; and removing the session result data from the data store, wherein said receiving the second request, said retrieving, said transmitting, and said removing are performed by the web service program.

16. A machine-executable process for supporting computer infrastructure, said process comprising automatically providing at least one support service for at least one of creating, integrating, hosting, maintaining, and deploying computer-readable code in a computing system, wherein the code in combination with the computing system is capable of performing a method for transferring unlimited amount of data for a web service transaction, the method performed by a Common Accounting Module (CAM) system comprising a client program, a web service program, a web interface program, and a data store, wherein the web service program services the web service transaction originating from the client program, the method comprising:

sending, to the web service program, a first web service call RequestSession to establish a user session between the web interface program and the web service program for a user of the client program such that the user directly interacts with the web interface program during the user session in performing the web service transaction and such that the user transfers the unlimited amount of data between the web service program and the web interface program without using the client program during the user session, wherein the first web service call RequestSession comprises a return address that is a Uniform Resource Locator (URL) of the client program to which a thread of execution returns from the web interface program once the user session ends, wherein the web service program provides services to the user in performing the web service transaction, wherein the web interface program corresponds to the web service program, wherein the data store is coupled to the web service program and the web interface program corresponding to the web service program, and wherein the web service program enables the client program to access the data store;

receiving, from the web service program, a first response in response to the first web service call RequestSession, the first response comprising a session identifier and an interface address, wherein the session identifier corresponds to the user session that is established by the web service program, wherein the interface address represents a Uniform Resource Locator (URL) of the web interface program by which the user accesses the web service program during the user session;

passing the thread of execution to the web interface program by use of the interface address such that the user directly interacts with the web interface program without using the client program during the user session identified by the received session identifier, wherein the web interface program directly receives interactive inputs provided by from the user such that the user interactively creates and stores session data items in the data store in accessing the web service program during the user session;

subsequent to said passing, regaining the thread of execution from the web interface program by use of the return address upon determining that the user session is terminated;

subsequent to said regaining the thread of execution, sending, to the web service program, a second web service call GetSessionResult to retrieve session result data comprising the session data items that had been created and stored in the data store during the user session; and in response to the second web service call GetSessionResult, acquiring the session result data stored in the data store from the web service program, wherein said sending the first web service call RequestSession, said receiving, said passing, said regaining, said sending the second web service call GetSessionResult, and said acquiring are performed by the client program of the CAM system.

17. The machine-executable process of claim 16, the method further comprising:

responsive to said sending the first web service call RequestSession, receiving the first web service call RequestSession from the client program, wherein the first web service call RequestSession further comprises a purchase document having multiple data items to be processed by the web service program to produce the session result data, wherein said unlimited amount of data transferred via the user session comprises the purchase document, and wherein the web service program provides accounting services;

establishing the user session pursuant to the received first web service call RequestSession by creating the session identifier and a session data associated with the session identifier, wherein the session result data comprises the session data and the purchase document, wherein the session data is a record stored in the data store that is uniquely identifiable by use of the session identifier, the session data comprising attributes of a web identifier for authenticating the user, a geographical area code for the web service transaction, a language code indicating a language to be used in the web service transaction, an accounting purpose code configuring the web service transaction, an application identifier corresponding to the client program, a document key representing a unique collection of data involved in the web service transaction, the unique collection of data including the purchase document, and a status code indicating an activity level of the user session;

associating the return address in the first web service call RequestSession with the session data in the data store; and sending the first response comprising the session identifier and the interface address to the client program such that the user utilizes the established user session for the web service transaction, wherein said receiving, said establishing, said associating, and said sending the first response are performed by the web service program.

18. The machine-executable process of claim 16, said method further comprising:

receiving an input from the user, wherein the input requests a web service provided by the web service program, wherein the web service transaction comprises the web service;

requesting the web service program to perform the web service requested by the received input; and determining that the user session is terminated by the user, wherein said receiving the input, said requesting, and said determining are performed by the web interface program during the user session, wherein the user session occurs subsequent to said passing and prior to said regaining by the client program.

19. The machine-executable process of claim 18, said method further comprising:

performing the web service requested by the web interface program, responsive to said requesting; and storing a result from said performing into the data store as the session result data, wherein said performing and said storing are performed by the web service program during the user session.

20. The machine-executable process of claim 16, the method further comprising:

responsive to said sending the second web service call GetSessionResult by the client program, receiving the second web service call GetSessionResult to retrieve the session result data from the data store;

retrieving the session result data from the data store pursuant to the second web service call GetSessionResult, wherein the session result data comprises the session identifier and the session data items;

transmitting the retrieved session result data to the client program; and removing the session result data from the data store, wherein said receiving the second request, said retrieving, said transmitting, and said removing are performed by the web service program.

* * * * *